United States Patent
Baek et al.

(10) Patent No.: US 8,195,692 B2
(45) Date of Patent: Jun. 5, 2012

(54) SYSTEM AND METHOD FOR MANAGING SEMANTIC AND SYNTACTIC METADATA

(75) Inventors: Ock Kee Baek, Unionville (CA); Arti Abhay Kale, Westminster, CO (US); Tao Liu, Beijing (CN); Pradeep Madaiah, Mysore (IN)

(73) Assignee: International Business Machines Corporation, Armonk, NY (US)

( * ) Notice: Subject to any disclaimer, the term of this patent is extended or adjusted under 35 U.S.C. 154(b) by 770 days.

(21) Appl. No.: 12/332,573

(22) Filed: Dec. 11, 2008

(65) Prior Publication Data

US 2010/0153331 A1 Jun. 17, 2010

(51) Int. Cl.
*G06F 7/00* (2006.01)
(52) U.S. Cl. .................................... 707/779; 706/45
(58) Field of Classification Search .................. 707/736, 707/755, 777–779; 706/45; 717/143
See application file for complete search history.

(56) References Cited

U.S. PATENT DOCUMENTS

| | | | |
|---|---|---|---|
| 5,751,909 A | | 5/1998 | Gower |
| 5,970,490 A * | | 10/1999 | Morgenstern ........................ 1/1 |
| 6,256,771 B1 | | 7/2001 | O'Neil et al. |
| 6,311,194 B1 * | | 10/2001 | Sheth et al. ................... 715/236 |
| 6,330,710 B1 | | 12/2001 | O'Neil et al. |
| 6,345,386 B1 | | 2/2002 | Delo et al. |
| 6,353,446 B1 | | 3/2002 | Vaughn et al. |
| 6,389,589 B1 | | 5/2002 | Mishra et al. |
| 6,418,554 B1 | | 7/2002 | Delo et al. |
| 6,463,445 B1 | | 10/2002 | Suzuki et al. |
| 6,523,166 B1 | | 2/2003 | Mishra et al. |
| 6,523,172 B1 * | | 2/2003 | Martinez-Guerra et al. . 717/143 |
| 6,538,667 B1 | | 3/2003 | Duursma et al. |
| 6,658,425 B1 | | 12/2003 | Sluiman |
| 6,836,794 B1 | | 12/2004 | Lucovsky et al. |
| 6,895,409 B2 | | 5/2005 | Uluakar et al. |
| 6,959,320 B2 | | 10/2005 | Shah et al. |
| 7,062,765 B1 | | 6/2006 | Pitzel et al. |
| 7,139,752 B2 * | | 11/2006 | Broder et al. ........................ 1/1 |
| 7,185,335 B2 | | 2/2007 | Hind et al. |
| 7,209,923 B1 * | | 4/2007 | Cooper ................................ 1/1 |
| 7,222,341 B2 | | 5/2007 | Forbes et al. |
| 7,433,876 B2 * | | 10/2008 | Spivack et al. ....................... 1/1 |
| 7,478,105 B2 * | | 1/2009 | Albornoz et al. ..................... 1/1 |
| 7,516,229 B2 * | | 4/2009 | Trastour et al. ............... 709/230 |
| 7,574,652 B2 * | | 8/2009 | Lennon et al. ................ 715/248 |
| 7,702,645 B2 * | | 4/2010 | Khushraj et al. ....... 707/999.102 |
| 7,702,673 B2 * | | 4/2010 | Hull et al. ..................... 707/707 |

(Continued)

OTHER PUBLICATIONS

Microsoft, "How to Deploy Office XP over a newtowrk", Sep. 13, 2004, Microsoft.

(Continued)

*Primary Examiner* — James Trujillo
*Assistant Examiner* — Linh Black
(74) *Attorney, Agent, or Firm* — Schmeiser, Olsen & Watts; John Pivnichny

(57) ABSTRACT

A method for managing semantic and syntactic metadata. The method begins with receiving heterogeneous data from either a machine or a human. Next, the method captures the semantic metadata corresponding to the received heterogeneous data by means of a semantic template. Next, the method captures the syntactic metadata corresponding to the received heterogeneous data by means of a syntactic template. After capturing the semantic and syntactic metadata, the method logically links the received heterogeneous data with the captured semantic and syntactic metadata. Finally, the method stores the received heterogeneous data in a repository.

16 Claims, 3 Drawing Sheets

U.S. PATENT DOCUMENTS

| | | | |
|---|---|---|---|
| 2002/0052883 | A1 | 5/2002 | Weissman-Berman |
| 2002/0116374 | A1 | 8/2002 | Bette et al. |
| 2002/0124270 | A1 | 9/2002 | Mori et al. |
| 2002/0166001 | A1 | 11/2002 | Cheng et al. |
| 2003/0084165 | A1 | 5/2003 | Kjellberg et al. |
| 2003/0131073 | A1 | 7/2003 | Lucovsky et al. |
| 2003/0158823 | A1 | 8/2003 | Fulton et al. |
| 2003/0195980 | A1 | 10/2003 | Geshwind |
| 2003/0221190 | A1 | 11/2003 | Deshpande et al. |
| 2003/0237050 | A1 | 12/2003 | Davidov et al. |
| 2004/0002991 | A1 | 1/2004 | Bogdan et al. |
| 2004/0024875 | A1 | 2/2004 | Horvitz et al. |
| 2004/0176968 | A1 | 9/2004 | Syed et al. |
| 2004/0228607 | A1 | 11/2004 | Tsutsumitake et al. |
| 2004/0261069 | A1 | 12/2004 | Verbeke et al. |
| 2005/0120353 | A1 | 6/2005 | Zhang et al. |
| 2005/0125519 | A1 | 6/2005 | Yang et al. |
| 2006/0074980 | A1 | 4/2006 | Sarkar |
| 2006/0206348 | A1 | 9/2006 | Chen et al. |
| 2006/0253397 | A1 | 11/2006 | Gomez et al. |
| 2007/0033659 | A1 | 2/2007 | Hoche et al. |
| 2007/0174308 | A1* | 7/2007 | Rausch .......... 707/100 |
| 2010/0185700 | A1* | 7/2010 | Bodain .......... 707/803 |

OTHER PUBLICATIONS

Microsoft, "How To: Use Group Policy Remotely Install Software in Windows 2000", Sep. 22, 2003, Microsoft.

Microsoft, "Domain Controller Roles", Mar. 28, 2003, Microsoft.

Fullerton et al., "Special Edition Using Microsoft Active Directory", Mar. 28, 2001, Que.

Russinovich et al., Microsoft Windows Internals, Dec. 8, 2004, Microsoft Press, Fourth Edition.

Balter et al., MCSE Windows XP Professional Exam Cram 2 (Exam 70-270), Nov. 2002, Exam Cram.

IBM Technical Disclosure Bulletin IPCOM000134640D; e-Science platform for cross-institutional, interdisciplinary, collaborative research in emerging sciences and technologies; Original Publication Date: Mar. 13, 2006. 5 pages.

IBM Technical Disclosure Bulletin IPCOM000021806D; Method and system for obtaining a price quotation from multiple remote distributors in real time using internet and communication API. Original Publication Date: Feb. 9, 2004. 6 pages.

Tilman, Michel; "Designing for Change, a Dynamic Perspective," http://users.pandora.be/michel.tilman/Publications/GCSE2000KN.doc; Lecture Notes of Computer Science, vol. 2177, Springer-Verlag, 2001. 11 pages.

Berhane Zewdie and C. R. Carlson, "Adaptive Component Paradigm for Highly Configurable Business Components," 2006 IEEE International Conference Electro/Information Technology, Pub. Date May 7-10, 2006, pp. 185-190.

U.S. Appl. No. 12/187,410, filed Aug. 7, 2008.

Office Action (Mail Date Jan. 3, 2008) for U.S. Appl. No. 11/243,857, filed Oct. 4, 2005.

May 5, 2008 filed Response to Office Action (Mail Date Jan. 3, 2008) for U.S. Appl. No. 11/243,857, filed Oct. 4, 2005.

Jul. 10, 2008 filed Supplemental Amendment in Response to Notice of Non-Compliant Amendment (Mail Date Jun. 17, 2008) for U.S. Appl. No. 11/243,857, filed Oct. 4, 2005.

Final Office Action (Mail Date Jun. 24, 2009) for U.S. Appl. No. 11/243,857, filed Oct. 4, 2005.

Sep. 22, 2009 filed Request for Continued Examination (RCE) for U.S. Appl. No. 11/243,857, filed Oct. 4, 2005.

Office Action (Mail Date Dec. 7, 2009) for U.S. Appl. No. 11/243,857, filed Oct. 4, 2005.

Mar. 5, 2010 filed Response to Office Action (Mail Date Dec. 7, 2009) for U.S. Appl. No. 11/243,857, filed Oct. 4, 2005.

Final Office Action (Mail Date Jul. 7, 2010) for U.S. Appl. No. 11/243,857, filed Oct. 4, 2005.

Oct. 5, 2010 filed Request for Continued Examination (RCE) for U.S. Appl. No. 11/243,857, filed Oct. 4, 2005.

Office Action (Mail Date Oct. 27, 2010) for U.S. Appl. No. 11/243,857, filed Oct. 4, 2005.

Feb. 16, 2011 filed Response to Office Action (Mail Date Oct. 27, 2010) for U.S. Appl. No. 11/243,857, filed Oct. 4, 2005.

Notice of Allowance (Mail Date Apr. 28, 2011) for U.S. Appl. No. 11/243,857, filed Oct. 4, 2005.

Jun. 2, 2011 filed Request for Continued Examination (RCE) with IDS for U.S. Appl. No. 11/243,857, filed Oct. 4, 2005.

Notice of Allowance (Mail Date Jun. 23, 2011) for U.S. Appl. No. 11/243,857, filed Oct. 4, 2005.

Ding et al., Swoogle: A Semantic Web Search and Metadata Engine. Dept. of Computer Science and Electronic Engineering, Univ. of Maryland Baltimore County, Baltimore MD 21250, USA. CKIM 2004. http://ebiquity.umbc.edu/_file_directory_papers/116.pdf.

Duval et al., Metadata Principles and Practicalities. D-Lib Magazine, Apr. 2002. vol. 8, No. 4. ISSN 1082-9873, 10 pages.

Hauch et al., Information Intelligence: Metadata for Information Discovery, Access, and Integration. SIGMOD 2005 Jun. 14-16, 2005. Baltimore Maryland, USA. ACM 1-59593-060-4/05/06, pp. 793-798.

Movva et al., Syntactic and Semantic Metadata Integration for Science Data Use. Computers & Geosciences 31 (2005) 1126-1134.

Qin et al., The Semantic and Syntactic Model of Metadata. [online]. 9 pages. [retrieved on Jan. 21, 2008.] Retrieved from the Internet:<URL: http//web.syr.edu/~jqin/papers/Metadata_model.pdf>.

Shasharina et al., FSML: Fusion Simulation Markup Language for Interoperability of D Analysis Tools. Proceedings. Challenges of Large Applications in Distributed Environments, Jul. 24, 2005, 7 pages. ISBN-10: 0 7803 9043 1.

High Overhead. [online]. 2 pages. [retrieved on Jun. 21, 2008]. Retrieved from the Internet:< URL: http://code916.gsfc.nasa.gov/Data_services/doc/df/node10.html>.

* cited by examiner

SYSTEM AND METHOD FOR MANAGING SEMANTIC AND SYNTACTIC METADATA

BACKGROUND OF THE INVENTION

The present invention relates generally to data management, and more particularly to identifying and storing semantic and syntactic metadata to better organize highly dimensional heterogeneous data.

Conventionally information technology is about deriving insight and knowledge through collaboration among multi-disciplinary researchers for modeling, clustering, analyzing, and mining of multidimensional data from various sources in an efficient manner.

One major challenge is accessibility to highly dimensional (e.g. numeric, string, binary, rectangular, graphic, audio, or video), heterogeneous (semantic and syntactic, data management systems such as flat files, binary, or character objects, relational data) and dispersed data. It becomes a bigger challenge and hindrance when multidisciplinary collaborators wish to worth together across institutional boundaries, due to absence of data standards to describe the semantic properties of data entities as well as a lack of data standards to describe the syntactic aspect of the data entries.

In addition, heterogeneous highly dimensional data is generated very rapidly. In order to keep pace with the newly generated data sets, a new approach, model, and system are required as the traditional model and system cannot be sustained.

SUMMARY OF THE INVENTION

The present invention provides a method for managing semantic and syntactic metadata, said method comprising:
  receiving heterogeneous data;
  after said receiving, capturing semantic metadata associated with said received heterogeneous data;
  after said receiving, capturing syntactic metadata associated with said received heterogeneous data;
  logically linking said received heterogeneous data and said captured semantic metadata and said syntactic metadata; and
  storing said heterogeneous data in a repository.

DETAILED DESCRIPTION OF THE DRAWINGS

Definitions

The term 'semantic metadata' as used herein refers to data that describes contextually relevant or domain-specific information about data (in the right context) based on an industry-specific or enterprise-specific metadata model or ontology.

The term 'syntactic metadata' as used herein refers to the grammatical rules and structural patterns governing the ordered use of appropriate formats and arrangement pertaining to data.

Specification

Although certain embodiments of the present invention are described herein, it is understood that modifications may be made to the present invention without departing from its course and scope. Scope of the present invention is not limited to the number of constituting components, the materials thereof, the shapes thereof, the relative arrangement thereof, etc. Furthermore, while the accompanying drawings illustrate certain embodiments of the present invention, such drawings are not necessarily depicted to scale.

Figure 1A:
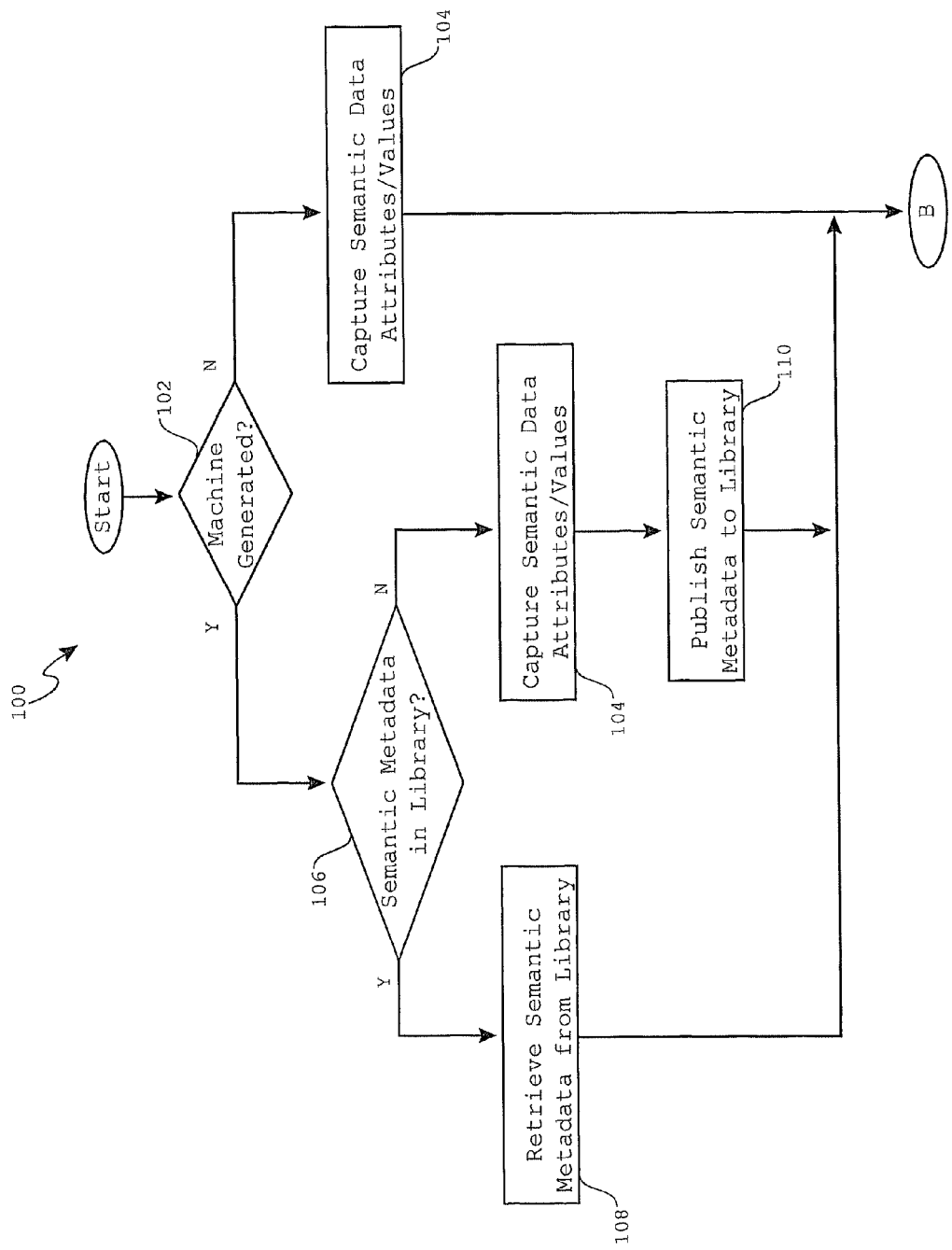
FIG. 1A and FIG. 1B (collectively referred to as FIG. 1) illustrates a method for managing semantic and syntactic metadata, in accordance with embodiments of the present invention.
Figure 1B:
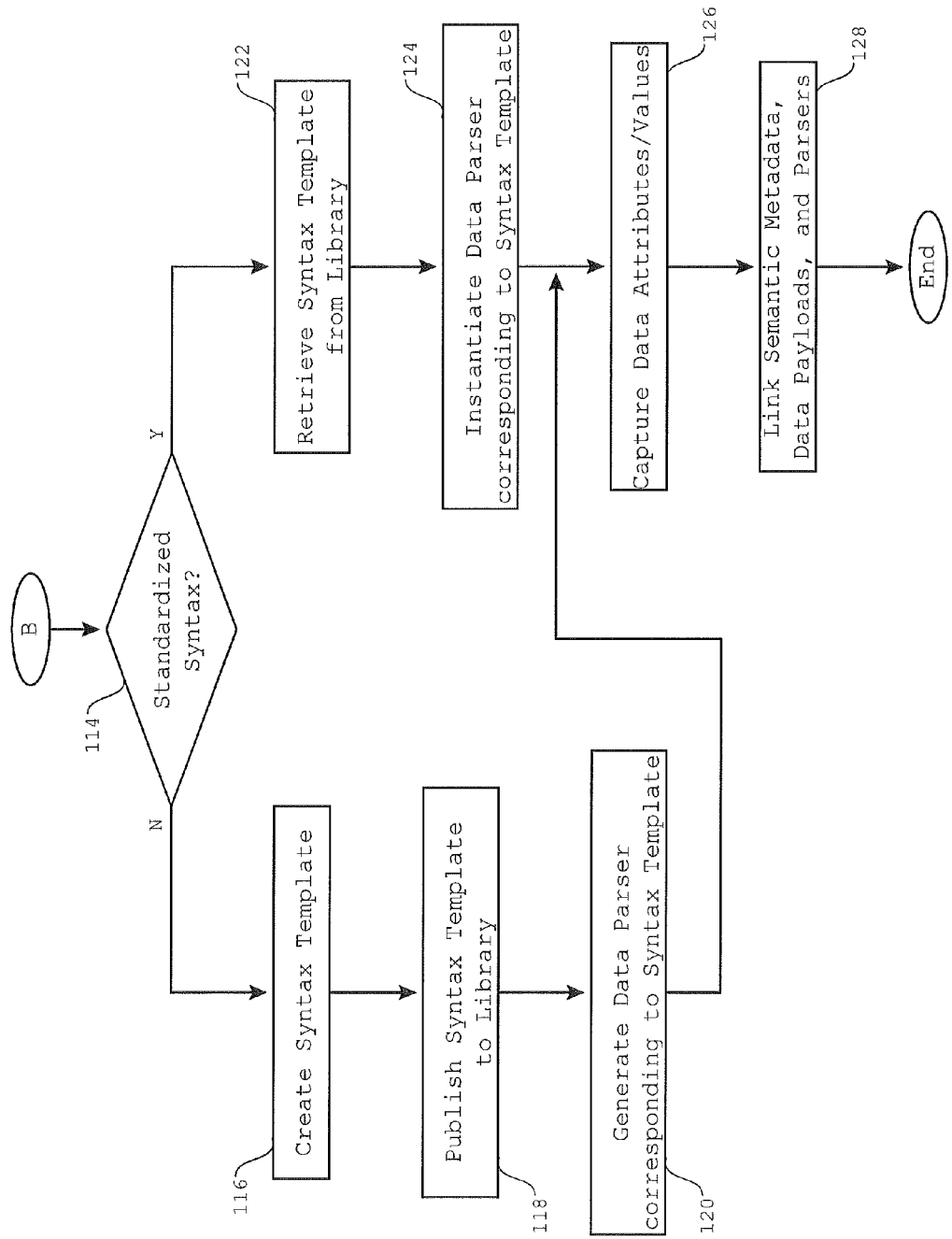

FIG. 1A and FIG. 1B (collectively referred to as FIG. 1) illustrates a method 100 for managing semantic and syntactic metadata, in accordance with embodiments of the present invention. The method 100 begins with step 102 which comprises determining whether the data received was machine generated.

Step 102 comprises determining whether the data received was machine generated. Machine generated data includes all data from any source, so long as the source is not a human. If the data source is a machine, either mechanical and/or digital, step 102 returns a response of 'yes' and the method 100 continues with step 106 which determining whether the semantic metadata resides in a library.

However, if the data source is not a machine (i.e. human generated), step 102 returns a response of 'no' and the method 100 continues with step 104 which comprises capturing the semantic data attributes and values.

In one embodiment of the present invention, step 102 identifies the source from which the data is being sent. For example, if step 102 identifies the source sending the data to be a Magnetic Resonance Imaging (MRI) machine, step 102 can conclude the source is a machine and return a response of 'yes'. However, if step 102 identifies the source sending the data to be an end user, step 102 will return a response of 'no'.

In an alternative embodiment of the present invention, step 102 will review the data itself to identify whether the data was machine generated. Reviewing the data may includes, inter alia, determining the data file extension(s), comparing the data file size with information stored in a library, review the data file contents, etc.

Step 104 comprises capturing the semantic data attributes and values. In one embodiment of the present invention, step 104 sends at least one question to an end user regarding the semantics of the data received prior to step 102. The end user may be, inter alia, the person who generated the data received prior to step 102, the person most knowledgeable with respect to the data received prior to step 102, a person of ordinary skill in the art corresponding to the data received prior to step 102, etc. The responses provided by the end user comprise the semantic data attributes and values corresponding to the data received prior to step 102. After completion of step 104, the method 100 continues with step 114 which comprises determining whether the data contains a standardized syntax.

Step 106 comprises determining whether the semantic metadata resides in a library. In one embodiment of the present invention, step 106 utilizes a library comprising both semantic and syntax templates. Step 106 searches the library for a semantic template comprising the semantic metadata residing in the data received prior to step 102. The semantic metadata residing in the data received prior to step 102 may contain an unique identifier to a specific template and step 102 therein would search the library for a semantic template sharing the same unique identifier.

In an alternative embodiment of the present invention, step 106 searches the library for templates corresponding to the device which generated the data received prior to step 102. After identifying templates corresponding to the device generating the received data, step 106 compares the template metadata to that of the received data's metadata.

If step 106 identifies a semantic template residing in the library matching the semantic metadata residing in the data received prior to step 102, then step 106 returns a response of 'yes' and the method 100 continues with step 108 which comprises retrieving the identified semantic metadata template from the library.

However, step 106 does not identify a semantic template residing in the library matching the semantic metadata residing in the data received prior to step 102, then step 106 returns a response of 'no' and the method 100 continues with step 110 which comprises capturing the semantic data attributes and values.

Step 108 comprises retrieving the identified semantic metadata template from the library. After completion of step 108, the method 100 continues with step 114 which comprises determining whether the data contains a standardized syntax.

Step 110 comprises capturing the semantic data attributes and values. Step 110 is performed identically to that of step 104, supra. After completion of step 110, the method 100 continues with step 112 which comprises publishing the semantic metadata in the library.

Step 112 comprises publishing the semantic metadata in the library. The semantic metadata attributes received pursuant to step 110 is stored as a metadata template in the library. After completion of step 112, the method 100 continues with step 114 which comprises determining whether the data contains a standardized syntax.

Step 114 comprises determining whether the data contains a standardized syntax. In one embodiment of the present invention, step 114 reviews the data received prior to step 102. The data, if produced according to a published standard syntactically, will contain metadata identifying the template to which the data corresponds. Therefore step 114 will compare the syntax metadata identifier in the data received prior to step 102 with the syntax templates residing in the library.

If step 114 identifying a syntax template residing in the library matching the syntax metadata identifier in the data, step 112 returns a response of 'yes' and the method 100 continues with step 122 which comprises retrieving the identified syntax template from the library.

However, if step 114 does not identify a syntax template residing in the library matching the syntax metadata identifier in the data, step 112 returns a response of 'no' and the method 100 continues with step 116 which comprises creating a syntax template.

Step 116 which comprises creating a syntax template. In one embodiment of the present invention, step 116 sends at least one question to an end user regarding the syntax of the data received prior to step 102. The end user may be, inter alia, the person who generated the data received prior to step 102, the person most knowledgeable with respect to the data received prior to step 102, a person of ordinary skill in the art corresponding to the data received prior to step 102, etc. The responses provided by the end user comprises the syntax information for the data received prior to step 102. After completion of step 116, the method 100 continues with step 118 which comprises publishing the syntax template to the library.

Step 118 comprises publishing the syntax template to the library. The syntax metadata information received pursuant to step 116 is stored as a syntax template in the library. After completion of step 118, the method 100 continues with step 120 which comprises generating a data parser corresponding to the syntax template stored pursuant to step 118.

Step 120 comprises generating a data parser corresponding to the syntax template stored pursuant to step 118. Step 120 creates parsing software capable of allowing an end user and/or another application the ability to access the data received prior to step 102 without prior knowledge of the data's format. The parsing software will be generated by step 120 pursuant to the syntax template created and published according to steps 116 and 118. After completion of step 120, the method continues with step 126 which comprises capturing the data attributes and values.

Step 122 comprises retrieving the identified syntax template from the library. Step 122 is invoked in response to the method 100 having determined that the data received prior to step 102 contains a standardized syntax. The standardized syntax of the data corresponds to a syntax template residing in the library. Step 122 retrieves from the library the syntax template matching the syntax of the data received prior to step 102. After completion of step 122, the method 100 continues with step 124 which comprises instantiating a data parser corresponding to the syntax template retrieved pursuant to step 122.

Step 124 comprises instantiating a data parser corresponding to the syntax template retrieved pursuant to step 122. The data parser allows an end user and/or another application the ability to access the data received prior to step 102 without prior knowledge of the data's format. Each syntax template residing in the library also corresponds to a unique data parser. Therefore, since the syntax for the data received is standardized and a syntax template resides in the library, so too does the data parser. Once the data parser is retrieved from the library step 124 ends and the method 100 continues with step 126 which comprises capturing the data attributes and values.

Step 126 comprises capturing the data attributes and values. Step 126 stores the data received prior to step 102 in a repository, the repository comprising datum from a multitude of sources. After storing all the data received prior to step 102, the method 100 continues with step 128 which comprises logically linking semantic metadata, the actual data, and the data parsers.

Step 128 comprises logically linking semantic metadata, the actual data, and the data parsers. In one embodiment of the present invention, step 128 creates a self-describing file by logically linking the semantic metadata, syntactic data format, and corresponding data parsers with the data residing in the repository. In an alternative embodiment of the present invention, the self-describing file is created by means of a pointer to each of the semantic metadata, syntactic metadata, and the data received prior to step 102.

In another alternative embodiment of the present invention, an entirely new file is created for the self-describing file, the new file containing the extracted semantic metadata, extracted syntactic metadata, as well as the actual data received prior to step 102. After completion of step 128, the method 100 ends.

Figure 2:
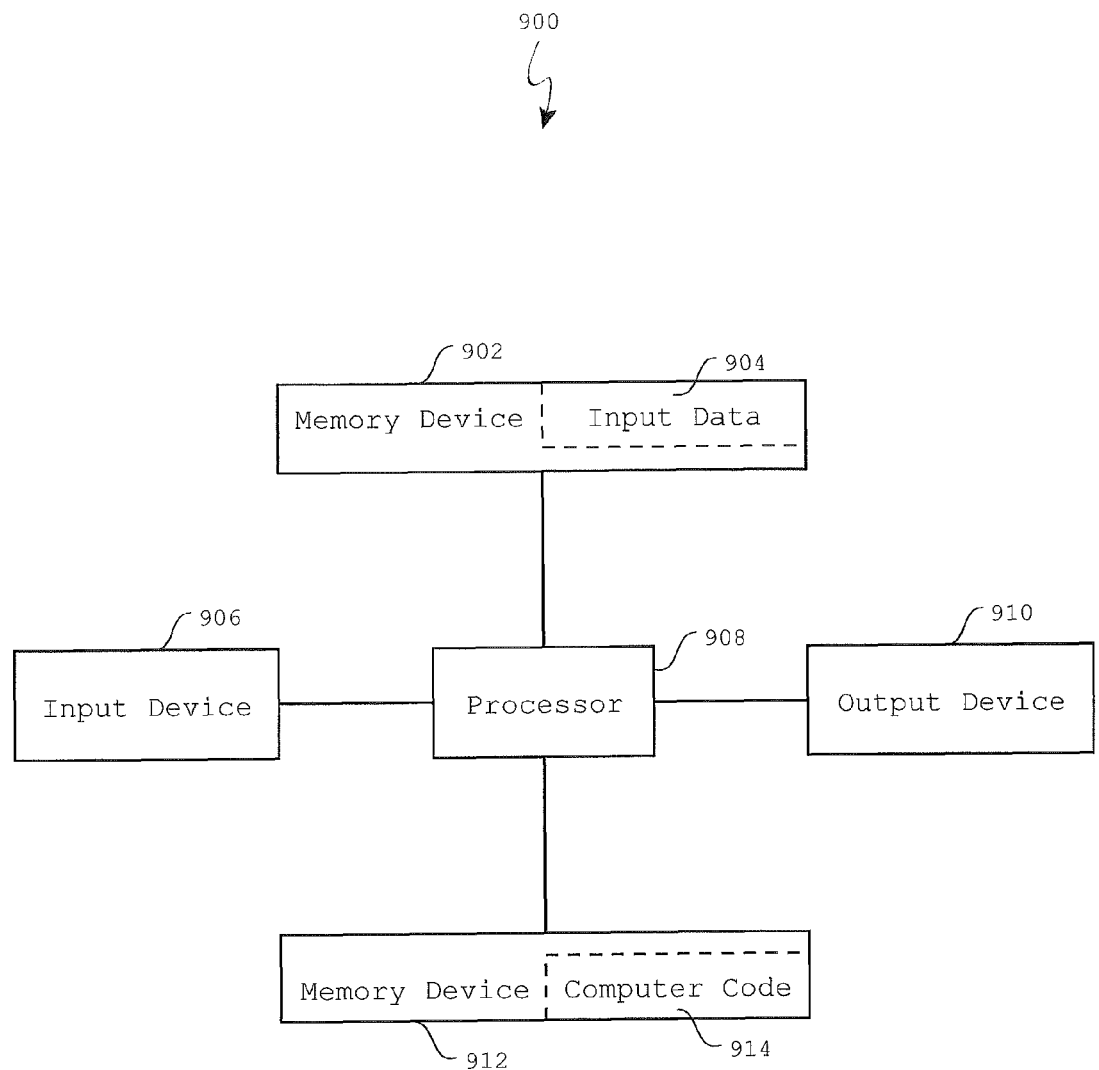
FIG. 2 illustrates a computer system which may facilitate a method for managing semantic and syntactic metadata, in accordance with embodiments of the present invention.

FIG. 2 illustrates a computer system 900 which may facilitate a method for managing semantic and syntactic metadata, in accordance with embodiments of the present invention.

The computer system 900 comprises a processor 908, an input device 906 coupled to the processor 908, an output device 910 coupled to the processor 908, and memory devices 902 and 912 each coupled to the processor 908.

The input device 906 may be, inter alia, a keyboard, a mouse, a keypad, a touchscreen, a voice recognition device, a sensor, a network interface card (NIC), a Voice/video over Internet Protocol (VOIP) adapter, a wireless adapter, a telephone adapter, a dedicated circuit adapter, etc.

The output device 910 may be, inter alia, a printer, a plotter, a computer screen, a magnetic tape, a removable hard disk, a floppy disk, a NIC, a VOIP adapter, a wireless adapter, a telephone adapter, a dedicated circuit adapter, an audio and/or visual signal generator, a light emitting diode (LED), etc.

The memory devices 902 and 912 may be, inter alia, a cache, a dynamic random access memory (DRAM), a read-only memory (ROM), a hard disk, a floppy disk, a magnetic tape, an optical storage such as a compact disc (CD) or a digital video disc (DVD), etc. The memory device 912 includes a computer code 914 which is a computer program that comprises computer-executable instructions.

The computer code 914 includes, inter alia, an algorithm used for managing semantic and syntactic metadata according to the present invention. The processor 908 executes the computer code 914. The memory device 902 includes input data 904. The input data 904 includes input required by the computer code 914. The output device 910 displays output from the computer code 914. Either or both memory devices 902 and 912 (or one or more additional memory devices not shown in FIG. 2) may be used as a computer usable medium (or a computer readable medium or a program storage device) having a computer readable program embodied therein and/or having other data stored therein, wherein the computer readable program comprises the computer code 914. Generally, a computer program product (or, alternatively, an article of manufacture) of the computer system 900 may comprise said computer usable medium (or said program storage device).

Any of the components of the present invention can be deployed, managed, serviced, etc. by a service provider that offers to deploy or integrate computing infrastructure with respect to a process for managing semantic and syntactic metadata. Thus, the present invention discloses a process for supporting computer infrastructure, comprising integrating, hosting, maintaining and deploying computer-readable code into a computing system (e.g., computing system 900), wherein the code in combination with the computing system is capable of performing a method for managing semantic and syntactic metadata.

In another embodiment, the invention provides a business method that performs the process steps of the invention on a subscription, advertising and/or fee basis. That is, a service provider, such as a Solution Integrator, can offer to create, maintain, support, etc. a process for managing semantic and syntactic metadata. In this case, the service provider can create, maintain, support, etc. a computer infrastructure that performs the process steps of the invention for one or more customers. In return, the service provider can receive payment from the customer(s) under a subscription and/or fee agreement, and/or the service provider can receive payment from the sale of advertising content to one or more third parties.

While FIG. 2 shows the computer system 900 as a particular configuration of hardware and software, any configuration of hardware and software, as would be known to a person of ordinary skill in the art, may be utilized for the purposes stated supra in conjunction with the particular computer system 900 of FIG. 2. For example, the memory devices 902 and 912 may be portions of a single memory device rather than separate memory devices.

While particular embodiments of the present invention have been described herein for purposes of illustration, many modifications and changes will become apparent to those skilled in the art. Accordingly, the appended claims are intended to encompass all such modifications and changes as fall within the true spirit and scope of this invention.

What is claimed:

1. A method for managing semantic and syntactic metadata, said method comprising:
   a processor of a computer system receiving heterogeneous data;
   after said receiving, said processor capturing semantic metadata associated with said received heterogeneous data;
   after said receiving, said processor capturing syntactic metadata associated with said received heterogeneous data;
   said processor logically linking said received heterogeneous data and said captured semantic metadata and said syntactic metadata; and
   said processor storing said heterogeneous data in a repository,
   said capturing said semantic metadata comprising:
      determining whether said received heterogeneous data utilizes a standardized syntax;
      if having determined that said received heterogeneous data utilizes the standardized syntax, then retrieving from a library a syntactic metadata template corresponding to said syntactic metadata associated with said received heterogeneous data;
      if having determined that said received heterogeneous data does not utilize the standardized syntax, then receiving at least one syntax response from an end user, each response of said at least one syntax response corresponding to a unique question of at least one syntax question to sent to the end user, each question of said at least one syntax question relating to syntactic attributes of said received heterogeneous data and storing in said library said at least one response as a unique syntactic metadata template;
      initiating a data parser to capture both said semantic metadata associated and said syntactic metadata associated with said received heterogeneous data, said capturing utilizing both said semantic metadata template and said syntactic metadata template.

2. The method of claim 1, said capturing said semantic metadata comprising prior to having determined whether said received heterogeneous data utilizes the standardized syntax:
   determining that said received heterogeneous data was not generated by a machine;
   after having determined that said received heterogeneous data was not generated by the machine, sending one or more questions to said end user, each question of said one or more questions relating to semantic attributes of said received heterogeneous data; and
   receiving at least one response from said end user, each response of said at least one response corresponding to a unique question of said one or more questions.

3. The method of claim 1, said capturing said semantic metadata comprising prior to having determined whether said received heterogeneous data utilizes the standardized syntax:
   determining that said received heterogeneous data was generated by a machine;
   after having determined that said received heterogeneous data was generated by the machine, determining that said semantic metadata associated with said received heterogeneous data does not reside in said library, said library comprising at least one semantic metadata template;
   after having determined that said semantic metadata associated with said received heterogeneous data does not reside in said library, sending one or more questions to said end user, each question of said one or more questions relating to semantic attributes of said received heterogeneous data;

receiving at least one response from said end user, each response of said at least one response corresponding to a unique question of said one or more questions; and storing in said library said at least one response as a unique semantic metadata template.

4. The method of claim 1, said capturing said semantic metadata comprising prior to having determined whether said received heterogeneous data utilizes the standardized syntax:

determining that said received heterogeneous data was generated by a machine;

after having determined that said received heterogeneous data was generated by the machine, determining that said semantic metadata associated with said received heterogeneous data resides in said library, said library comprising at least one semantic metadata template; and after having determined that said semantic metadata associated with said received heterogeneous data resides in said library, retrieving from said library a semantic metadata template corresponding to said semantic metadata associated with said received heterogeneous data.

5. A computer program product, comprising a computer-readable storage device having a computer-readable program code stored therein, said computer-readable program code containing instructions that when executed by a processor of a computer system implement a method for managing semantic and syntactic metadata, said method comprising:

said processor receiving heterogeneous data;

after said receiving, said processor capturing semantic metadata associated with said received heterogeneous data;

after said receiving, said processor capturing syntactic metadata associated with said received heterogeneous data;

said processor logically linking said received heterogeneous data and said captured semantic metadata and said syntactic metadata; and said processor storing said heterogeneous data in a repository, said capturing said semantic metadata comprising:

determining whether said received heterogeneous data utilizes a standardized syntax;

if having determined that said received heterogeneous data utilizes the standardized syntax, then retrieving from a library a syntactic metadata template corresponding to said syntactic metadata associated with said received heterogeneous data;

if having determined that said received heterogeneous data does not utilize the standardized syntax, then receiving at least one syntax response from an end user, each response of said at least one syntax response corresponding to a unique question of at least one syntax question to sent to the end user, each question of said at least one syntax question relating to syntactic attributes of said received heterogeneous data and storing in said library said at least one response as a unique syntactic metadata template;

initiating a data parser to capture both said semantic metadata associated and said syntactic metadata associated with said received heterogeneous data, said capturing utilizing both said semantic metadata template and said syntactic metadata template.

6. The computer program product of claim 5, said capturing said semantic metadata comprising prior to having determined whether said received heterogeneous data utilizes the standardized syntax:

determining that said received heterogeneous data was not generated by a machine;

after having determined that said received heterogeneous data was not generated by the machine, sending one or more questions to said end user, each question of said one or more questions relating to semantic attributes of said received heterogeneous data; and receiving at least one response from said end user, each response of said at least one response corresponding to a unique question of said one or more questions.

7. The computer program product of claim 5, said capturing said semantic metadata comprising prior to having determined whether said received heterogeneous data utilizes the standardized syntax:

determining that said received heterogeneous data was generated by a machine;

after having determined that said received heterogeneous data was generated by the machine, determining that said semantic metadata associated with said received heterogeneous data does not reside in said library, said library comprising at least one semantic metadata template;

after having determined that said semantic metadata associated with said received heterogeneous data does not reside in said library, sending one or more questions to said end user, each question of said one or more questions relating to semantic attributes of said received heterogeneous data;

receiving at least one response from said end user, each response of said at least one response corresponding to a unique question of said one or more questions; and storing in said library said at least one response as a unique semantic metadata template.

8. The computer program product of claim 5, said capturing said semantic metadata comprising prior to having determined whether said received heterogeneous data utilizes the standardized syntax:

determining that said received heterogeneous data was generated by a machine;

after having determined that said received heterogeneous data was generated by the machine, determining that said semantic metadata associated with said received heterogeneous data resides in said library, said library comprising at least one semantic metadata template; and after having determined that said semantic metadata associated with said received heterogeneous data resides in said library, retrieving from said library a semantic metadata template corresponding to said semantic metadata associated with said received heterogeneous data.

9. A computing system comprising a processor coupled to a computer-readable memory device, said memory device comprising a software application, said software application comprising instruction that when executed by said processor, implement a method for managing semantic and syntactic metadata, said method comprising:

said processor receiving heterogeneous data;

after said receiving, said processor capturing semantic metadata associated with said received heterogeneous data;

after said receiving, said processor capturing syntactic metadata associated with said received heterogeneous data;

said processor logically linking said received heterogeneous data and said captured semantic metadata and said syntactic metadata; and said processor storing said heterogeneous data in a repository, said capturing said semantic metadata comprising:
- determining whether said received heterogeneous data utilizes a standardized syntax;
- if having determined that said received heterogeneous data utilizes the standardized syntax, then retrieving from a library a syntactic metadata template corresponding to said syntactic metadata associated with said received heterogeneous data;
- if having determined that said received heterogeneous data does not utilize the standardized syntax, then receiving at least one syntax response from an end user, each response of said at least one syntax response corresponding to a unique question of at least one syntax question to sent to the end user, each question of said at least one syntax question relating to syntactic attributes of said received heterogeneous data and storing in said library said at least one response as a unique syntactic metadata template;
- initiating a data parser to capture both said semantic metadata associated and said syntactic metadata associated with said received heterogeneous data, said capturing utilizing both said semantic metadata template and said syntactic metadata template.

10. The computing system of claim 9, said capturing said semantic metadata comprising prior to having determined whether said received heterogeneous data utilizes the standardized syntax:
- determining that said received heterogeneous data was not generated by a machine;
- after having determined that said received heterogeneous data was not generated by the machine, sending one or more questions to said end user, each question of said one or more questions relating to semantic attributes of said received heterogeneous data; and
- receiving at least one response from said end user, each response of said at least one response corresponding to a unique question of said one or more questions.

11. The computing system of claim 9, said capturing said semantic metadata comprising prior to having determined whether said received heterogeneous data utilizes the standardized syntax:
- determining that said received heterogeneous data was generated by a machine;
- after having determined that said received heterogeneous data was generated by the machine, determining that said semantic metadata associated with said received heterogeneous data does not reside in said library, said library comprising at least one semantic metadata template;
- after having determined that said semantic metadata associated with said received heterogeneous data does not reside in said library, sending one or more questions to said end user, each question of said one or more questions relating to semantic attributes of said received heterogeneous data;
- receiving at least one response from said end user, each response of said at least one response corresponding to a unique question of said one or more questions; and
- storing in said library said at least one response as a unique semantic metadata template.

12. The computing system of claim 9, said capturing said semantic metadata comprising prior to having determined whether said received heterogeneous data utilizes the standardized syntax:
- determining that said received heterogeneous data was generated by a machine;
- after having determined that said received heterogeneous data was generated by the machine, determining that said semantic metadata associated with said received heterogeneous data resides in said library, said library comprising at least one semantic metadata template; and
- after having determined that said semantic metadata associated with said received heterogeneous data resides in said library, retrieving from said library a semantic metadata template corresponding to said semantic metadata associated with said received heterogeneous data.

13. A process for supporting computer infrastructure, said process comprising providing at least one support service for at least one of creating, integrating, hosting, maintaining, and deploying computer-readable code in a computing system, wherein said code in combination with the computing system is capable of implementing a method for managing semantic and syntactic metadata, said method comprising:
- a processor of the computing system receiving heterogeneous data;
- after said receiving, said processor capturing semantic metadata associated with said received heterogeneous data;
- after said receiving, said processor capturing syntactic metadata associated with said received heterogeneous data;
- said processor logically linking said received heterogeneous data and said captured semantic metadata and said syntactic metadata; and
- said processor storing said heterogeneous data in a repository, said capturing said semantic metadata comprising:
- determining whether said received heterogeneous data utilizes a standardized syntax;
- if having determined that said received heterogeneous data utilizes the standardized syntax, then retrieving from a library a syntactic metadata template corresponding to said syntactic metadata associated with said received heterogeneous data;
- if having determined that said received heterogeneous data does not utilize the standardized syntax, then receiving at least one syntax response from an end user, each response of said at least one syntax response corresponding to a unique question of at least one syntax question to sent to the end user, each question of said at least one syntax question relating to syntactic attributes of said received heterogeneous data and storing in said library said at least one response as a unique syntactic metadata template;
- initiating a data parser to capture both said semantic metadata associated and said syntactic metadata associated with said received heterogeneous data, said capturing utilizing both said semantic metadata template and said syntactic metadata template.

14. The process for supporting computer infrastructure of claim 13, said capturing said semantic metadata comprising prior to having determined whether said received heterogeneous data utilizes the standardized syntax:
- determining that said received heterogeneous data was not generated by a machine;
- after having determined that said received heterogeneous data was not generated by the machine, sending one or more questions to said end user, each question of said one or more questions relating to semantic attributes of said received heterogeneous data; and receiving at least one response from said end user, each response of said at least one response corresponding to a unique question of said one or more questions.

15. The process for supporting computer infrastructure of claim 13, said capturing said semantic metadata comprising prior to having determined whether said received heterogeneous data utilizes the standardized syntax:

determining that said received heterogeneous data was generated by a machine;

after having determined that said received heterogeneous data was generated by the machine, determining that said semantic metadata associated with said received heterogeneous data does not reside in said library, said library comprising at least one semantic metadata template;

after having determined that said semantic metadata associated with said received heterogeneous data does not reside in said library, sending one or more questions to said end user, each question of said one or more questions relating to semantic attributes of said received heterogeneous data;

receiving at least one response from said end user, each response of said at least one response corresponding to a unique question of said one or more questions; and storing in said library said at least one response as a unique semantic metadata template.

16. The process for supporting computer infrastructure of claim 13, said capturing said semantic metadata comprising prior to having determined whether said received heterogeneous data utilizes the standardized syntax:

determining that said received heterogeneous data was generated by a machine;

after having determined that said received heterogeneous data was generated by the machine, determining that said semantic metadata associated with said received heterogeneous data resides in said library, said library comprising at least one semantic metadata template; and after having determined that said semantic metadata associated with said received heterogeneous data resides in said library, retrieving from said library a semantic metadata template corresponding to said semantic metadata associated with said received heterogeneous data.

\* \* \* \* \*